G. K. Snow,

Paper Folding Machine.

No. 941. Reissued Apr. 3. 1860.

Witnesses;
R. H. Eddy
F. P. Haig Jr.

Inventor;
Geo. K. Snow

N. PETERS, PHOTO-LITHOGRAPHER, WASHINGTON, D. C.

UNITED STATES PATENT OFFICE.

GEORGE K. SNOW, OF WATERTOWN, MASSACHUSETTS.

IMPROVEMENT IN MACHINES FOR FOLDING PAPER.

Specification forming part of Letters Patent No. 7,722, dated October 15, 1850; Reissue No. 941, dated April 3, 1860.

*To all whom it may concern:*

Be it known that I, GEORGE K. SNOW, of Watertown, in the county of Middlesex and State of Massachusetts, have invented a new and useful or Improved Machine for Folding Sheets of Paper; and I do hereby declare that the same is fully described and represented in the following specification and the accompanying drawings, of which—

Figure 1:
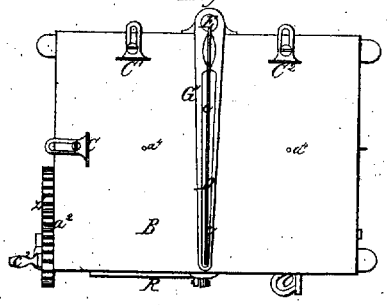
Figure 7:
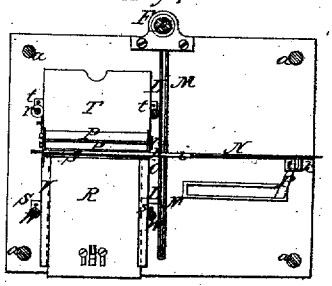
Figure 2:
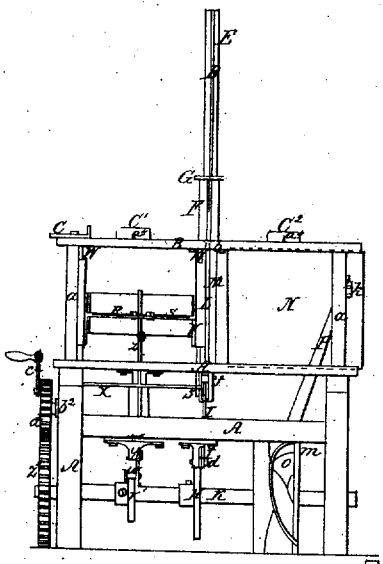
Figure 4:
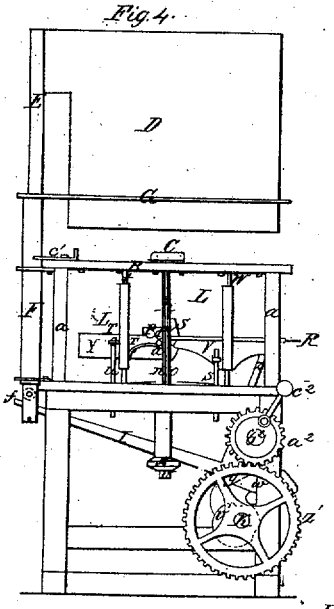
Figure 5:
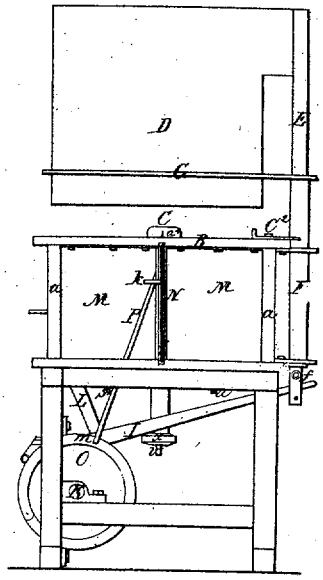
Figure 3:
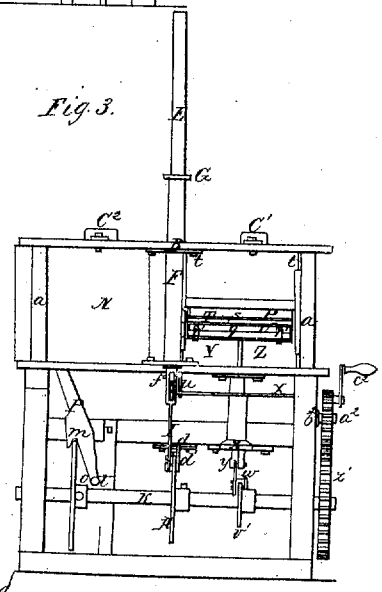
Figure 6:
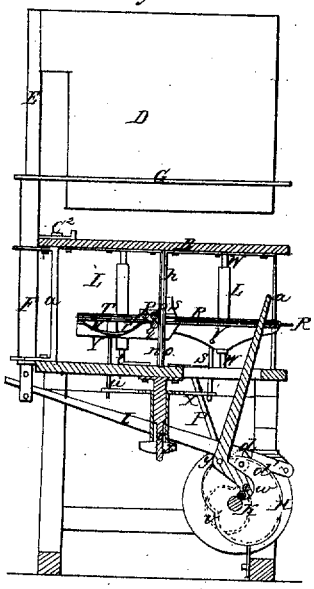

Figure 1 denotes a top view of my said improved machine. Fig. 2 is a front elevation of it. Fig. 3 is a rear elevation of it. Fig. 4 is an elevation of one end of it. Fig. 5 is an elevation of the other end of it. Fig. 6 is a transverse and vertical section taken through the middle of the last sliding folding-plate. Fig. 7 is a horizontal section taken through the second sliding folding-plate.

In the drawings, A represents the frame or table by which the operative parts of the machine are supported. Above this frame, and parallel to it, is a slotted plate or surface, B, which is supported by four or any other suitable number of posts, *a a*. This plate B has an elongated slot or passage, *b*, made through its middle part, and of a length somewhat greater than the width of the sheet of paper of the largest size the machine is calculated to fold. On the upper surface of the plate B suitable gages, C C′ $C^2$, may be affixed, against which the edges of the sheet of paper may be made to rest, in order to centralize it or properly place it with respect to the slot *b*. $a^4$ $a^4$ are register-points projecting from the top surface of the table, their purpose being to enable the sheet to be properly placed or adjusted on the table, and with reference to the paper-folding machinery.

Above the slot of the plate B, directly in the plane of it and perpendicular to the plate, is a thin frame or metallic folding-plate, D, which is affixed to and made to project from a vertical slide-rod, E, which is supported by and so as to be capable of sliding freely up and down within an upright socket-tube, F, firmly fastened to the main frame. An arm, G, projects horizontally from the upper end of the socket-tube and directly over, and at a suitable distance above the slot *b*, the said arm being provided with a slot, *c*, for the reception and steadying of the vertical plate D. The rod E, and, of course, the plate D, is elevated by means of a cam, H, and a lever, I. The said cam is fixed on the driving-shaft K, and when the said shaft is revolved the periphery of the cam is made to act or bear against a pin or stud, *d*, which projects from the side of the lever I. The said lever turns in a vertical plane through the lower end of the rod E, and bears against a friction-roller, *f*, fixed on the lower part of the rod. The descent of the plate D is effected by its own weight or by a spring or by a second pin, *d′*, placed underneath the first stud *d*, and which operates in connection with the cam H, as seen in Fig. 6.

Below the slot *b* two plates, L M, are made to extend down to the top of the table or main frame, they being placed parallel to each other and so that while the folding-plate D is made to extend from its highest to its lowest position it shall pass directly between the said two plates. Vertical slots or passages *h i* are made through the respective plates L M, and so as to permit a second folding-plate, N, to pass directly through them and the two plates, and in a plane at right angles to the said plates. The said second folding-plate is supported and slides within grooves made in the upper side of the table-top and in the under side of the plate B, and it has a reciprocating rectilinear motion imparted to it at proper times by the acting of a cam, *o*, upon a lever, P. The upper end of the lever P passes through a staple, K, while its lower end turns on a fulcrum or pin at *l*. The lever is made to straddle the periphery of the cam, as seen at *m*, the cam being so formed as when revolved to not only impart to the Plate N the necessary movements, but to allow it to remain at rest during such times as the first folding-plate may be in performance of its operation on a sheet of paper, or, in other words, during that time which is occupied by the first folding-plate in its descent and ascent.

The plate L may be provided with two lips, *n o*, made to extend from it at right angles, their object being to prevent the edges of the slot of such plate from cutting or tearing the paper during its passage through the slot. A thin folding-plate, R, is arranged horizontally and at right angles to the plate L, and is made to pass through a vertical slotted plate, S.

One or more top rollers, *p p*, and a bottom pressure-roller, *q*, are used in connection with the folding-plate, they being arranged with respect thereto as seen in the drawings. The lower roller, *q* has its journals upheld by springs, one of which is seen at *r*. A reciprocating motion is given to the third folding-plate in such manner as to cause it to pass through the slot of the plate S, and between the roller *q* and the rollers *p p* over it. During such movement of the plate it is caused to meet the sheet of paper, which has previously been twice folded, and to force it between the rollers in such manner as to fold it a third time. Were nothing to prevent, the sheet of paper during the retrograde movement of the folding-plate would drop down upon the table-top, or be discharged from the machine; but as it is desirable to arrange the folded sheets in regular packs, an apparatus for accomplishing the packing of the sheets may be employed. This apparatus consists of the plates T U, the former of which is stationary, and is arranged with respect to the roller or rollers *p*, as seen in Fig. 6. Underneath the plate T, and upheld by springs *r′ r′*, or suitable equivalents, the plate U is placed.

The sheets of paper as they are successively forced between and beyond the rollers *p p* and *q* are received between the two plates T U, the lower one of which will gradually descend in proportion as the pack increases in size.

The folding-plate R is sustained by, and slides within, a frame, *v*, which is made to slide freely up or down on two or more vertical rods, W W, and is connected to a horizontal plate or frame, *x*, by rods *s s*. The plates T U and the rollers *p p q* are also supported by a frame, Y, which is made to slide freely up or down on vertical rods *t t*, and is connected to the frame or plate *x* by rods *u u*. The frame X has an elevating and depressing screw, *v*, and nut *x*, so applied to it as to enable it to be readily raised or lowered as occasion may require, the frames V and R moving with it. The reciprocating movements and intervals of rest of the third folding-plate are regulated and produced by a cam, *v′*, acting against a projection, *w*, from a lever, *z*, whose fulcrum is at *y*, the upper arm of the said lever being jointed to or properly made to extend through the folding-plate. The main or cam shaft K may be rotated by any proper means. In the drawings it is shown as having a spur-gear, *z′*, upon one end. With this gear another gear, $z^2$, engages the said gear $a^2$, being made to turn upon a pin, $b^2$, and by means of power applied to a crank, $c^2$, suitably fixed to it, (the gear.)

In the operation of folding a sheet of paper it is laid upon the plate B. The first folder-plate is next brought down upon the middle of it, and so as to force the sheet through the slot of the plate and down between the retaining-plates L M. Next the folder-plate D rises upward to its original position and leaves the paper (folded once) between the said two plates. Next, the second folding-plate N is advanced upon the sheet, forces it from between the two retaining-plates, again folds it, places it in a position for the third folding-plate to act upon it, and returns or retrogrades to its original position. The third folding-plate next performs its office, and produces the third fold, the first folder-plate being also put in operation at the same time with the third and on the next sheet of paper.

The rollers I employ with the third folder do not seize the sheet and draw it away from the folder and fold it independently of the folder as do the moving and converging surfaces used in the machine as patented on or about the 27th day of November, A. D. 1849.

I do not claim as my invention any machinery in which paper is folded by being struck either upward or in any other direction, and in the line in which the fold is to be made and from a surface on which it has been extended and seized between converging surfaces, or converging and moving surfaces, which complete the fold and deliver the folded paper.

My invention consists principally in a combination of machinery or parts in which the paper " " " " " is not seized, completely folded, and delivered by converging and moving surfaces, such as two series of endless tapes and rollers. I make use of no such contrivances and their operative machinery in combination with a mere bar or contrivance for acting against the middle of the sheet, and pressing such middle part between such converging surfaces which seize the sheet, draw it away from the said bar or contrivance, complete the fold, and deliver the paper.

My improvement or combination, as invented and claimed by me, consists of the following elements: first, a slotted plate, B, table or contrivance for receiving and supporting the sheet; second, two parallel planes or plates, L M, extending at right angles from such support and so arranged that there shall be one of the said plates on each side of the slot *b* of the first element or support of the sheet; third, a striking and folding frame or plate, D, so arranged and operated as to press the paper against the middle or other proper part of it, force it downward through the slot and between the two parallel plates, the said parallel plates operating to complete the fold and hold the sheet of paper during the return or retrograde movement of the striking frame or plate.

In combination therewith, I claim—

1. A second striking and folding plate, N, arranged at right angles to the said two parallel plates, and made so as to pass or operate through them or their slots, and directly after the said retrograde movement of the first one, as to press against the sheet of paper and force it through one of the said slots, and thereby once more or a second time fold it.

2. In combination with such second combination of mechanism, a third striking and folding plate, R, and slotted parallel folding-plate S, and friction-rollers *p q*, or equivalent contrivances, the same being for supporting the twtce-folded sheet of paper, folding it a third time, and subsequently discharging it, such discharge taking place in consequence of the return or retrograde movement of the striking or doubling plate, as above described.

3. The combination of one or more register-points or a registering apparatus with the sheet-receiving table or platform, and an apparatus for producing one or more folds in the sheet.

4. A combination composed not only of machinery for folding sheets of paper, but machinery for receiving and piling or packing such sheets in a regular pile or pack.

5. The combination of mechanism which is applied to the striking-plate and its rollers or folding contrivances, and used for packing the sheets, the said mechanism consisting of the stationary plate T and the spring-plate U, or plate and its springs, or other proper equivalents which permit the recession of the plate in proportion as the pack of sheets increases in size, the whole being arranged and made to operate substantially in the manner as hereinbefore specified.

6. The combination of one or more edge-gages C C′ C² with the sheet-receiving platform and an apparatus for folding paper, substantially as described.

In testimony whereof I have hereunto set my signature.

GEO. K. SNOW.

Witnesses:
R. H. EDDY,
F. P. HALE, Jr.